US012781606B2

(12) United States Patent
Fisher

(10) Patent No.: US 12,781,606 B2
(45) Date of Patent: Nov. 3, 2026

(54) SYSTEM AND METHOD FOR DELIVERING PROPPANT FROM A PROPPANT SOURCE TO A WELL SITE

(71) Applicant: Halliburton Energy Services, Inc., Houston, TX (US)

(72) Inventor: Chad A. Fisher, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 378 days.

(21) Appl. No.: 18/380,518

(22) Filed: Oct. 16, 2023

(65) Prior Publication Data

US 2025/0122790 A1 Apr. 17, 2025

(51) Int. Cl.

| | |
|---|---|
| ***E21B 43/26*** | (2006.01) |
| ***B60P 3/22*** | (2006.01) |
| ***B65D 88/30*** | (2006.01) |
| ***E21B 43/267*** | (2006.01) |

(52) U.S. Cl.

CPC ............ *E21B 43/2607* (2020.05); *B60P 3/22* (2013.01); *B65D 88/30* (2013.01); *E21B 43/267* (2013.01)

(58) Field of Classification Search

CPC ........ B65G 67/02; B65G 67/24; B65G 67/99; B65G 65/30; B65D 88/30; E21B 43/2607

See application file for complete search history.

(56) References Cited

U.S. PATENT DOCUMENTS

| | | | | |
|---|---|---|---|---|
| 3,362,490 | A | 1/1968 | Maxwell | |
| 4,182,591 | A | 1/1980 | Stanelle | |
| 4,337,878 | A | 7/1982 | Brock | |
| 4,750,530 | A | 6/1988 | Helle et al. | |
| 9,624,036 | B2 * | 4/2017 | Luharuka | B65G 67/00 |
| 9,718,610 | B2 | 8/2017 | Oren | |
| 10,814,767 | B2 | 10/2020 | Oren | |
| 11,530,090 | B2 | 12/2022 | Dacar et al. | |
| 2013/0022441 | A1 | 1/2013 | Uhryn et al. | |
| 2014/0216736 | A1 * | 8/2014 | Leugemors | B01F 35/7549 166/266 |
| 2014/0299225 | A1 * | 10/2014 | Oren | B65G 65/32 141/2 |
| 2014/0305769 | A1 * | 10/2014 | Eiden, III | B65D 88/12 222/173 |
| 2016/0264352 | A1 | 9/2016 | Oren | |
| 2018/0072491 | A1 * | 3/2018 | D'Agostino | B65B 7/16 |
| 2021/0300739 | A1 * | 9/2021 | Surjaatmadja | B66F 9/063 |
| 2025/0187818 | A1 * | 6/2025 | Dacar | B65D 88/54 |

FOREIGN PATENT DOCUMENTS

WO 2019156652 A1 8/2019

OTHER PUBLICATIONS

Examiner's Report mailed Apr. 1, 2025 in Canadian Patent Application No. 3,218,710.

Examiner's Report mailed Nov. 20, 2025 in Canadian Patent Application No. 3218710.

* cited by examiner

*Primary Examiner* — Kaitlin S Joerger

(74) *Attorney, Agent, or Firm* — The Hilton Firm PLLC

(57) ABSTRACT

A proppant delivery system for delivering proppant to a well site comprises a first vehicle having a first container configured to carry a first load of proppant and deliver the first load of proppant to a location. The system further comprises a second vehicle configured to deliver a second container at the location to receive a portion of the first load into the second container. The container remains on the second vehicle during loading of the second container.

17 Claims, 5 Drawing Sheets

SYSTEM AND METHOD FOR DELIVERING PROPPANT FROM A PROPPANT SOURCE TO A WELL SITE

TECHNICAL FIELD

The present disclosure relates generally to proppant delivery for wellbore operations, and more particularly to a system and method for delivering proppant from a proppant source to a well site or a location remote from the well site.

BACKGROUND

Hydrocarbon-bearing subterranean formations may be stimulated by hydraulically fracturing the subterranean formation. A general fracturing operation may comprise pumping a fracturing fluid at a pressure above the fracture gradient of the subterranean formation. This pressurized fracturing fluid may then contact the subterranean formation to form one or more fractures. Some fracturing fluids utilize proppants to "prop open" and maintain separation of fractures that are created. Proppant materials can vary, but typically proppants are either sand-based or ceramic-based materials. A large amount of proppant is often needed on well sites that employ hydraulic fracturing. Often the components of a fracturing fluid are mixed or blended at the well site, and the components are delivered to the well site independently and stored.

When proppants such as sand are delivered to a well site, transportation costs may be significant. Depending on the method of delivery and handling of the proppant at the well site, the proppant may also create a dusty environment that may impede operations at the well site.

BRIEF DESCRIPTION OF THE DRAWINGS

Illustrative examples of the present disclosure are described in detail below with reference to the attached drawing figures, which are incorporated by reference herein, and wherein.

Figure 1:
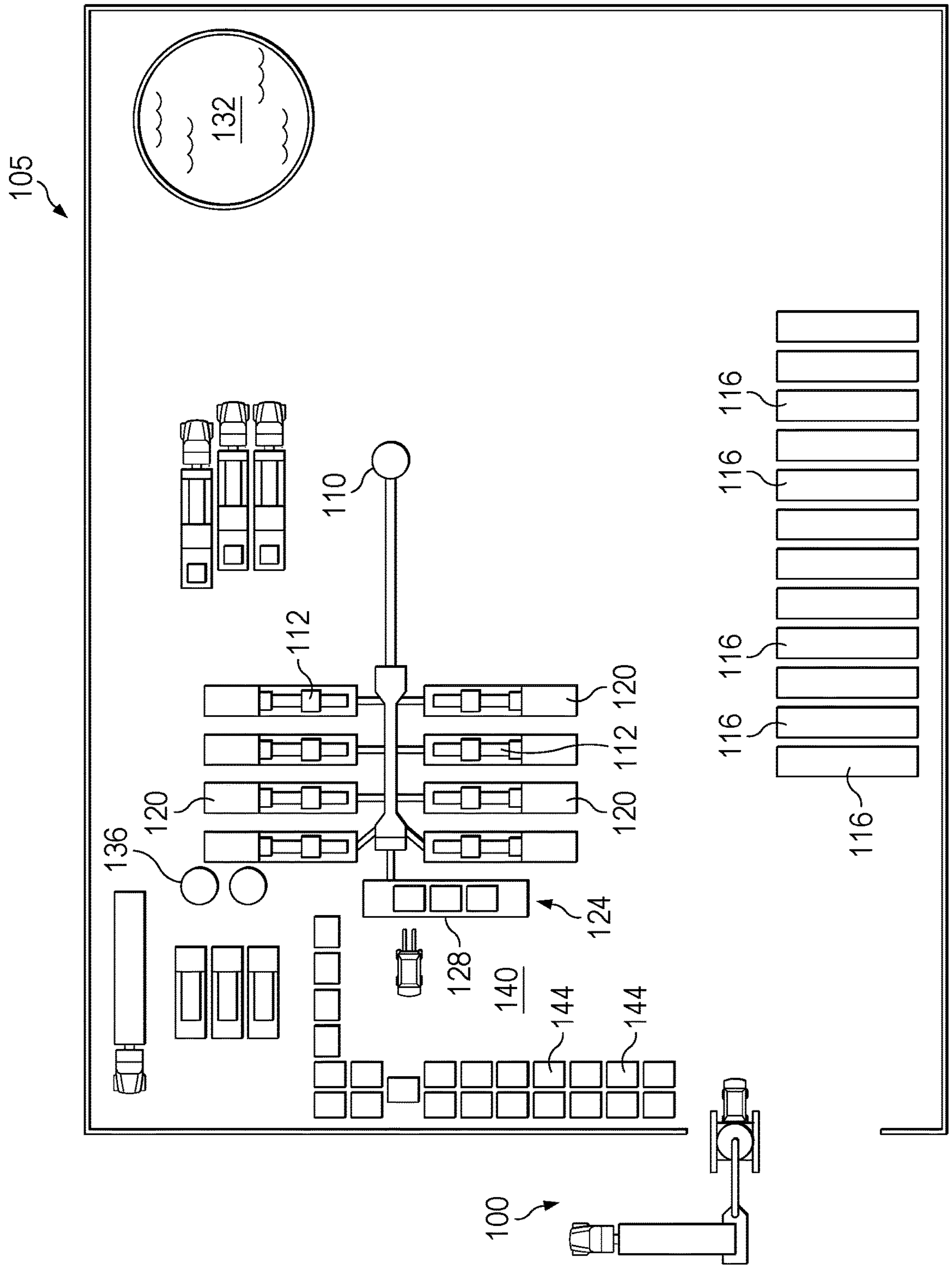
FIG. 1 is a plan view of a well site having a proppant delivery system according to an embodiment.

The illustrated figures are only exemplary and are not intended to assert or imply any limitation with regard to the environment, architecture, design, or process in which the different examples may be implemented.

DETAILED DESCRIPTION

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The present disclosure relates generally to proppant delivery for wellbore operations, and more particularly to a system and method for delivering proppant from a proppant source to a well site or a location remote from the well site. Earlier methods for delivering proppant to a well site involved transporting a bulk load of proppant to the well site and dumping or otherwise unloading the bulk load of proppant in a particular area. Many times the proppant would simply be placed on the ground or on a pad, and as needed, a material moving machine such as a front-end loader would access the bulk-stored proppant and transport loads of proppant to blend with fracturing fluid. This method of delivery created excessively dusty conditions at the well site, exposed the bulk pile of proppant to contaminants, and also resulted in reduced operational efficiency. It has become more common to use proppant containers at the well site to store proppant, and proppant is now typically delivered to well sites by trucks over long distances that carry the proppant containers already filled with proppant. The proppant containers are unloaded at the well site and stored for future use. Use of proppant containers may provide certain advantages at the well site for storage and use of the proppant, but a problem is presented due to the restrictions placed on vehicles and their loads when traveling on public roadways. Transport vehicles are limited to a particular cargo weight limit, which may be 80,000 pounds or even less in some areas. Since the proppant containers weigh a substantial amount, transportion of the containers with the proppant pre-loaded in the containers decreases the amount of proppant that may be transported from the proppant source to the well site. This combination of container, proppant, and transport trailer weight creates a payload disadvantage since less proppant can be hauled by a single vehicle. This disadvantage is amplified as the distance from the sand source to the well site is increased.

The systems and methods described herein provide a first vehicle that receives a load of proppant from a proppant source and transports the load of proppant without dividing the proppant load into individualized containers that must be carried by the first vehicle. Instead the proppant is carried by a first container on the first vehicle that holds the entire proppant load. After transporting the load of proppant from the proppant source to a location, a portion of the proppant load is delivered from the first container to a second container carried by a second vehicle. The second container is a smaller container than the first container and is used to store the proppant at the location. The second container is loaded with proppant without removing the second container from the second vehicle, thereby reducing "container touches," reducing average fill time and improving efficiency.

FIG. 1 illustrates a plan view of a well site 105 at which a proppant delivery system 100 is deployed to receive proppant from a proppant source according to an embodiment. The well site 105 includes a well 110 that may extend into a subterranean hydrocarbon formation. A plurality of hydraulic fracturing pumps 112 are deployed at the well site 105 to pump fracturing fluid into the well 110 to fracture the formation prior to production. In some embodiments, a plurality of electric generators 116 may be provided to power a plurality of electric motors 120 that drive the fracturing pumps 112. In other embodiments, the fracturing pumps 112 may not be driven by electric motors, but rather by gasoline or diesel engines.

Fracturing fluids may be prepared at a mixing area 124 of the well site 110. The mixing area 124 may include a plurality of mixing units 128 capable of mixing and blending the various components that are combined to form the fracturing fluid. The components may include water, chemicals and proppant. A water source 132 such as a tank may be positioned at the well site 110 to feed water to the mixing area 124. Water storage tanks 136 may be used to store water for the fracturing fluid near the mixing area 124.

The proppant source may be any location at which proppant may be procured or obtained. In some instances, the proppant source may be a sand mine. In others, the proppant source may be a facility that processes the proppant prior to its use in a well. Still other sources for the proppant are possible. The proppant source in many cases may be a great distance (50-100 miles or more) from the well site. Because of this distance and the regulations dictating weight limits for over-the-road transportation of bulk materials, it is advantageous to maximize the amount of proppant carried by the transport vehicle. As discussed in more detail below, maximizing the amount of proppant that can be legally carried by the transport vehicle means carrying the proppant in a large single container and not in individual smaller containers that would weigh more collectively than the large single container.

A proppant storage area 140 may be provided to store proppant that is to be mixed or blended in the mixing area 124 to create the fracturing fluid. The proppant may be stored in proppant containers 144 that are generally cube shaped but could instead be cylinders. Preferably the containers 144 are small enough to be easily movable by forklift or other material handling devices. The containers 144 may be stackable to allow for more efficient storage, and in some embodiments, the containers may have lids or covers. The proppant stored in the storage area 140 may be any type of proppant used in subterranean wells for hydraulic fracturing purposes. The type of proppant used may vary depending on the formation being fractured, but common examples may be sand-based proppants or ceramic-based proppants. It is possible that different types of proppants may be stored in the proppant storage area 140 if it is anticipated that different formation characteristics will be encountered during fracturing of the well 110.

The proppant delivery system 100 is deployed at or adjacent to the well site 105 and may be positioned proximate the proppant storage area 140, although this is not necessarily required. Examples of the proppant delivery system 100 are described in more detail below with reference to FIGS. 3-5.

Figure 2:
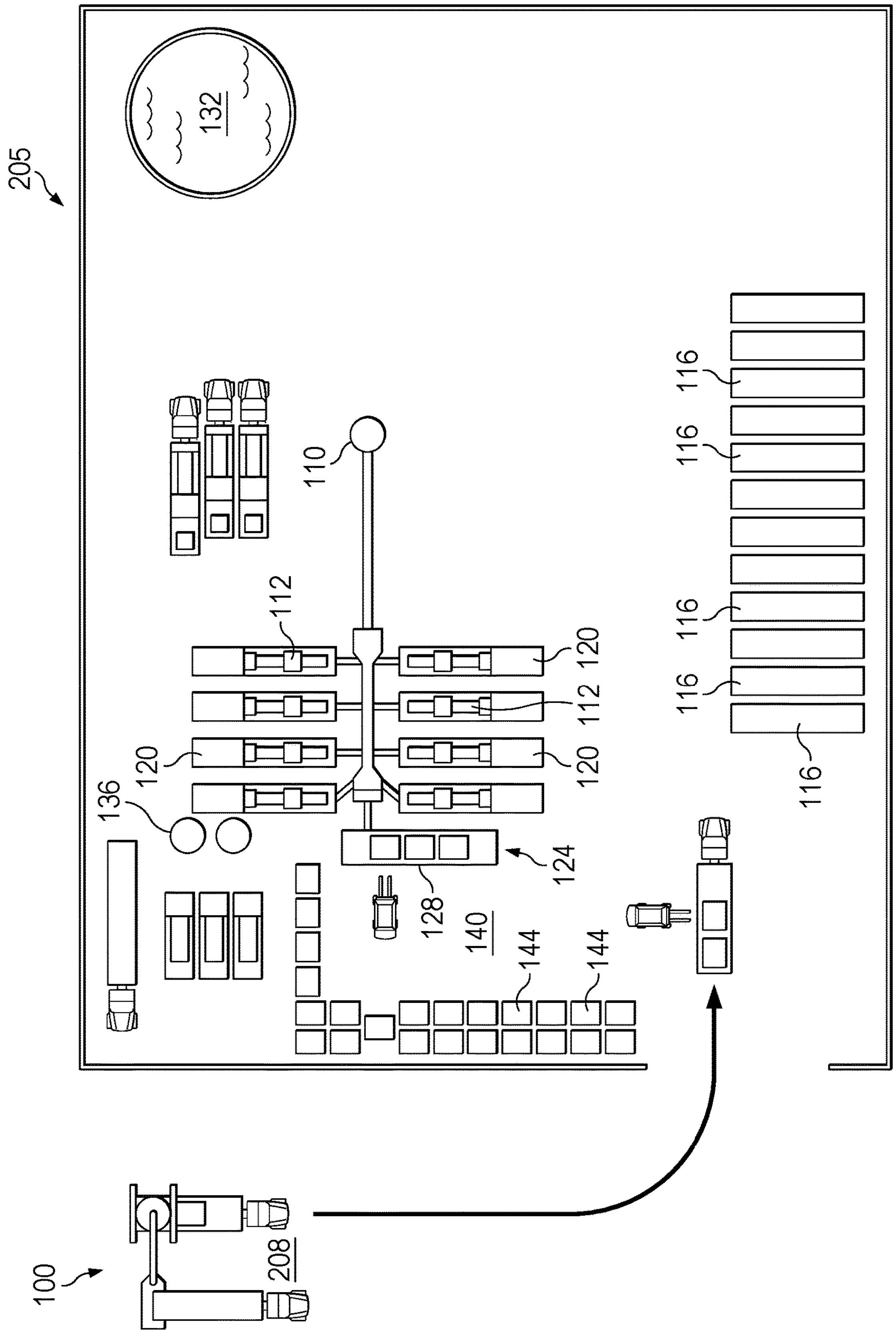
FIG. 2 is a plan view of a well site and a location remote from the well site having a proppant delivery system according to an embodiment.

FIG. 2 illustrates a plan view of a well site 205 and a location 208 remote from the well site at which a proppant delivery system 200 is deployed to receive proppant from a proppant source according to an embodiment. The well site 205 illustrated in FIG. 2 may be similar to the well site 105 illustrated in FIG. 1, and accordingly, equipment at well site 205 has been referenced with the same reference numerals as those shown in FIG. 1. It should be understood that the equipment shown in FIGS. 1 and 2 as being deployed at the well sites 105, 205 may differ depending on the particular well site location and the geology of the underlying hydrocarbon formation.

The remote location 208 is preferably at least 2500 feet away from the well site 205, but in many cases, may be substantially more. In some embodiments, the remote location 208 may be a mile or even more from the well site 205. The remote location 208 is substantially closer in distance to the well site 205 than the proppant source, and this difference in distance highlights the advantage of the proppant delivery system 200 described herein. By transporting proppant from the proppant source to the remote location 208 (or in the case of FIG. 1 directly to the well site 105) on a first vehicle that does not include a plurality of individualized proppant containers, the amount of proppant transported by the vehicle can be maximized. This creates operational efficiencies since fuel is not wasted transporting unnecessary weight from the proppant source to the remote location. The step of unloading proppant from the first vehicle and loading proppant into individualized proppant containers occurs at the remote location, and each individualized proppant container is loaded while on a second vehicle capable of delivering the individual proppant containers to the proppant storage area 140 at the well site 205. Again efficiencies are realized by not unloading the containers from the second vehicle prior to loading proppant into the containers at the remote location 208. In some instances, the shorter path between the remote location 208 and the well site 205 may not be regulated to impose a maximum cargo weight, but even if a maximum weight is imposed, it is more efficient to transfer the proppant and the extra weight of the individual containers this shorter distance between the remote location 208 and the well site 205, as compared to the much longer distance between the proppant source and the well site 205.

Figure 3:
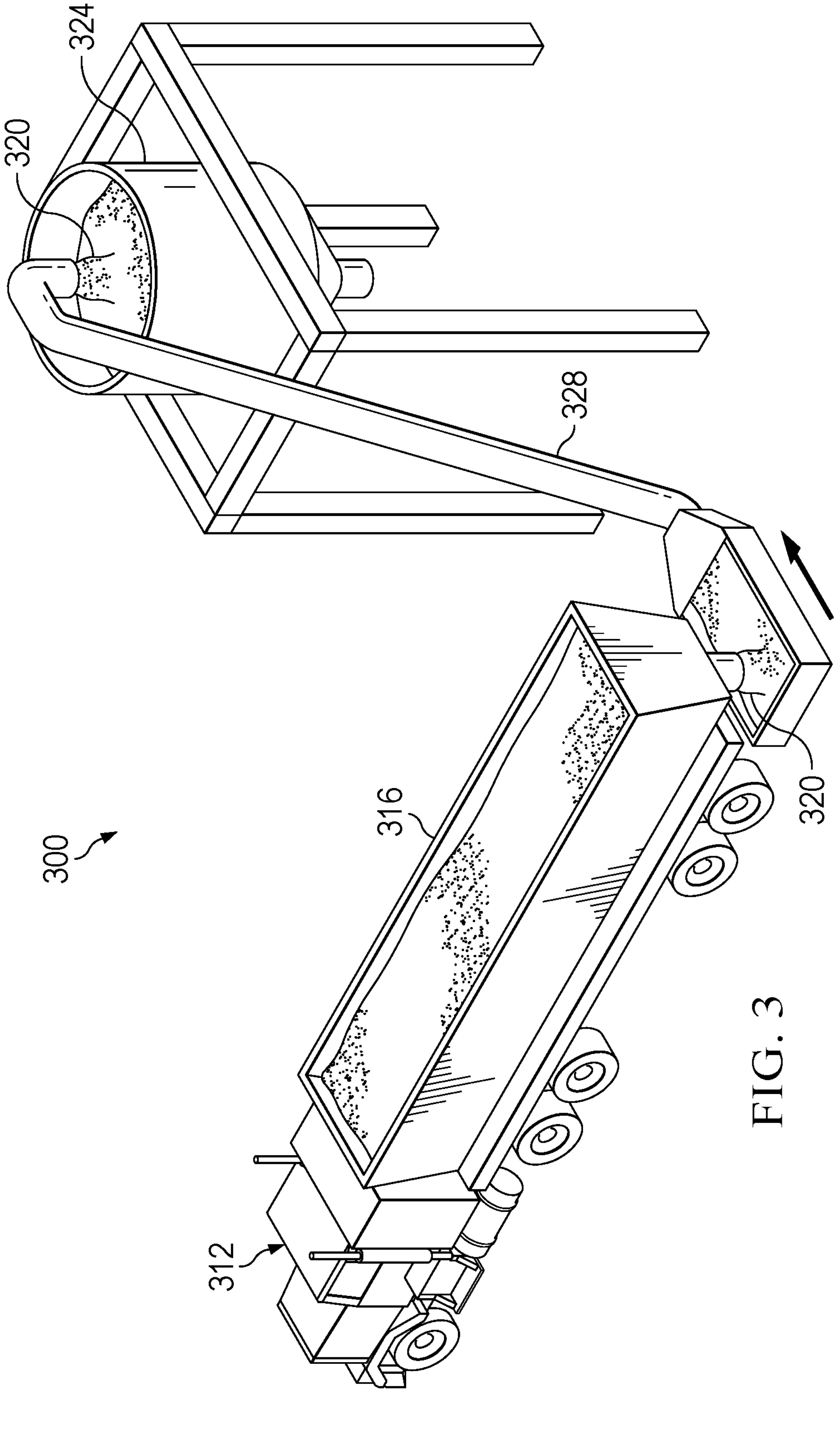
FIG. 3 is a schematic view of a proppant delivery system according to an embodiment.

FIG. 3 illustrates a schematic view of a proppant delivery system 300 according to an illustrative embodiment. The proppant delivery system 300 is similar to the proppant delivery systems 100, 200 deployed at the well site 105 or the remote location 208, respectively. The proppant delivery system 300 may include a first vehicle 312 having a first container 316 positioned on the first vehicle 312. The first vehicle 312 is configured to receive a load of proppant 320 at a proppant source and transport the load of proppant 320 to either the well site 105 or the remote location 208. The proppant source in many embodiments will be a relatively long distance from the well site or remote location (i.e., sometimes greater than 50-100 miles or more). The first vehicle 312 may be any vehicle capable of transporting the load of proppant 320, but in some embodiments, the first vehicle 312 will be an over-the-road truck and trailer rig that is capable of carrying heavy loads of bulk material. More specifically, the first vehicle may be a truck having a belly dump container, an end-dump container such as a dump truck, or a container that is loaded and unloaded from the top of the container.

The proppant delivery system 300 may further include an intermediate storage bin 324 at the well site 105 or remote location 208 to receive the load of proppant 320 from the first container 316 of the first vehicle 312. The load of proppant 320 may be delivered from the first container 316 to the intermediate storage bin 324 by a conveyance device 328. The conveyance device 328 may be a conveyor belt that is driven by an electric motor or alternatively by a mechanical engine such as a gasoline or diesel engine. In other embodiments, the conveyance device may be a closed duct through which pressurized air or other gases are circulated to push the proppant through the duct and into the intermediate storage bin 324.

In the embodiment illustrated in FIG. 3, the proppant 320 from the first container 316 is fed by gravity into the conveyance device 328 beneath the first container 316. The proppant is then carried by the conveyance device 328 upward and dropped into the top of the intermediate storage bin 324. Alternative unloading methods are possible in some embodiments. Instead of unloading from beneath the first container 316, such as would be the case with a belly dump container, the first container 316 may be unloaded from an end of the first container 316 or from the top. In one embodiment, instead of conveying the proppant upward to the intermediate storage bin 324, the first vehicle 316 may be driven onto an elevated platform (not shown) that positions the first container 316 above the intermediate storage bin 324 so that the proppant may be dropped into the intermediate storage bin 324.

The intermediate storage bin 324 may be elevated above ground level as shown in FIG. 3, and may be used to store the load of proppant 320 from the first container 316, or it may be used to immediately transfer portions of the load of proppant to individual smaller containers as detailed below. In some embodiments, it may be desirable to omit the use of the intermediate storage bin 324 and instead deliver portions of the load of proppant from the first container 316 directly into smaller containers. In such embodiments, the first vehicle 312 may be elevated relative to the smaller container prior to delivery, or alternatively, the portion of the load of proppant may be directly conveyed by a conveyance device into the smaller container.

In each of the unloading and transferring operations discussed herein, the immediate area surrounding the release of proppant made be shrouded or otherwise covered or contained to reduce the presence of dust at either the well site 105 or the remote location 208.

Figure 4:
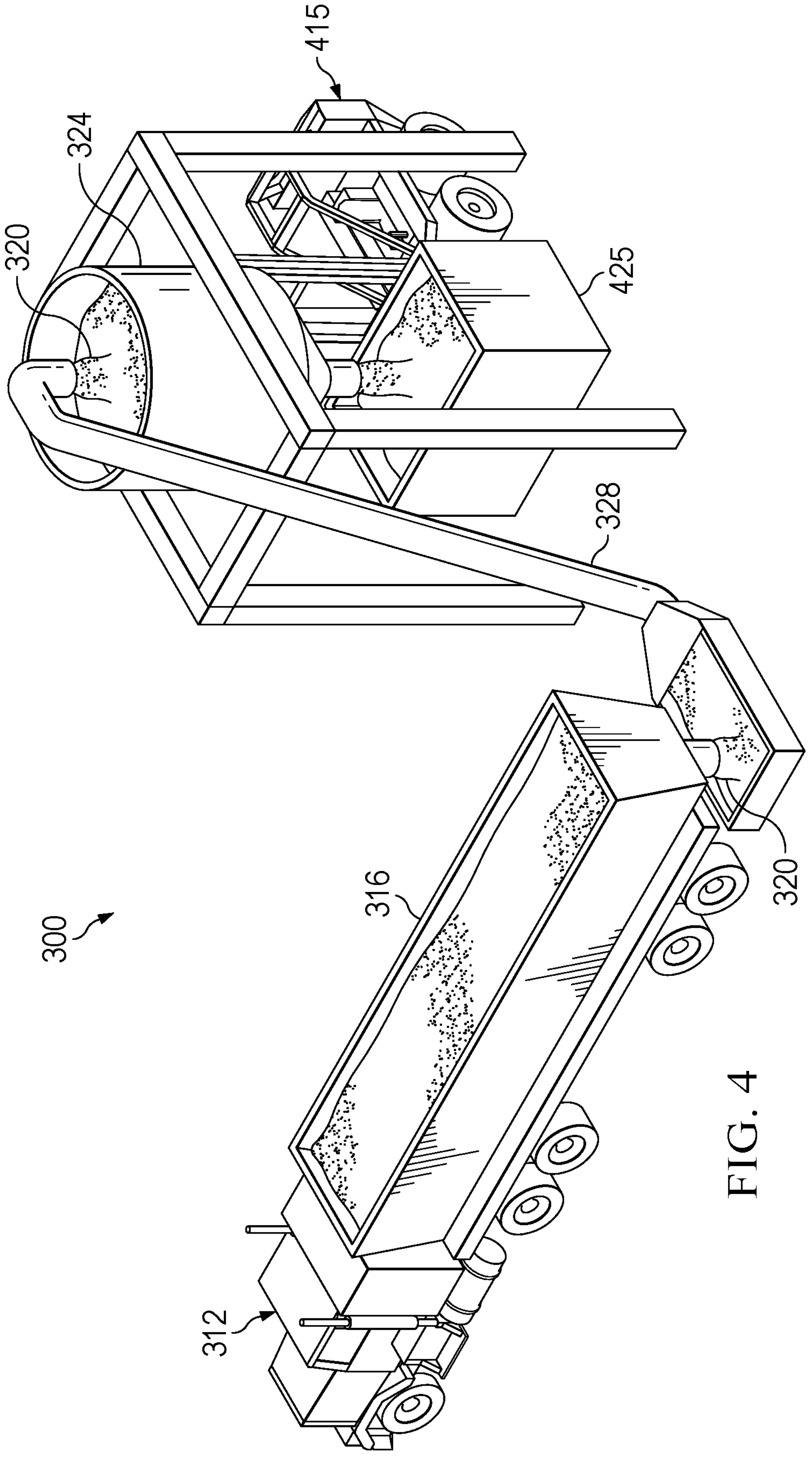
FIG. 4 is a schematic view of the proppant delivery system of FIG. 3 along with a second vehicle having a second container for receiving a portion of a load of proppant according to an embodiment.
Figure 5:
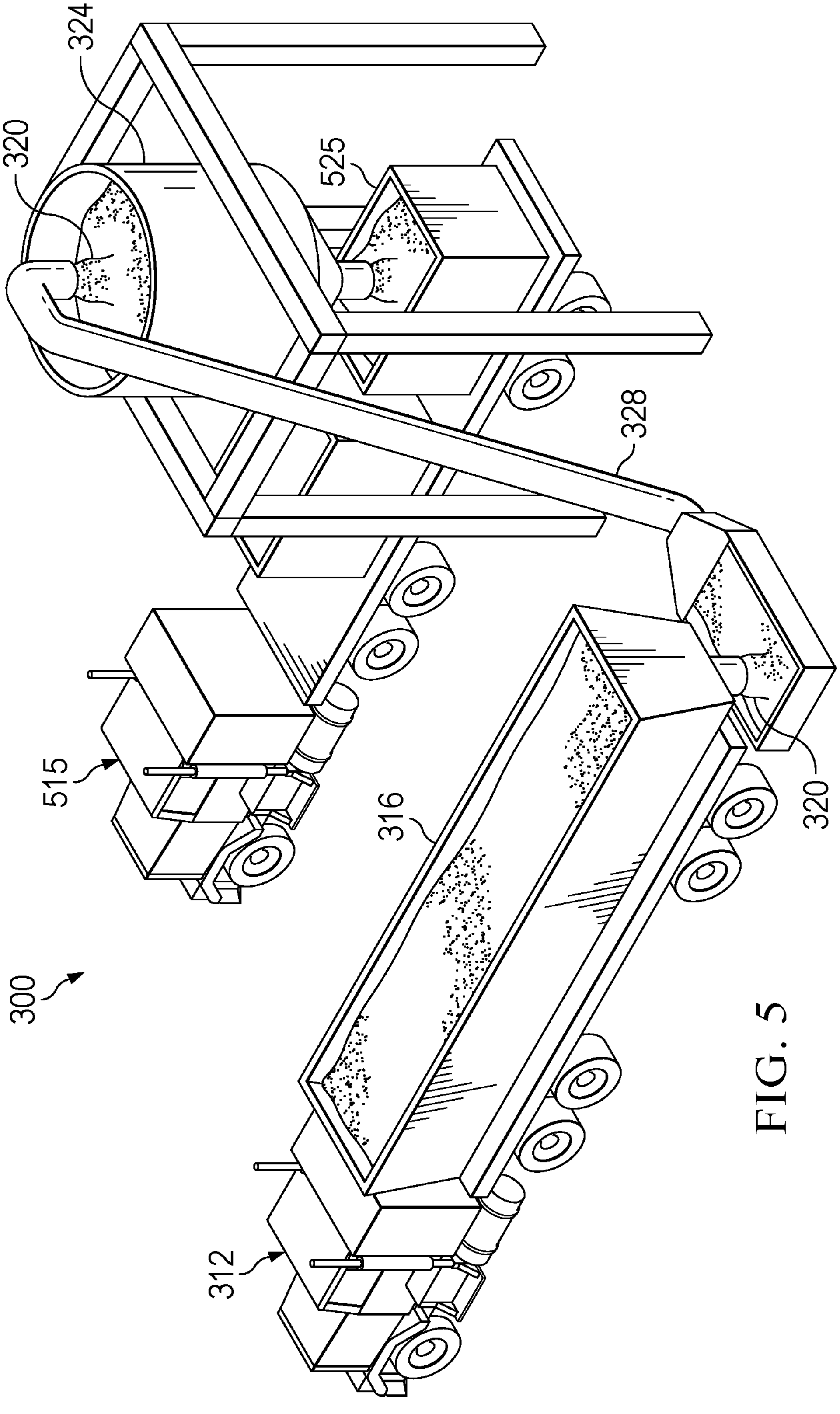
FIG. 5 is a schematic view of the proppant delivery system of FIG. 3 along with a second vehicle having a second container for receiving a portion of a load of proppant according to an embodiment.

FIGS. 4 and 5 illustrate a schematic view of the proppant delivery system 300 of FIG. 3 according to an illustrative embodiment. Referring more specifically to the embodiment illustrated in FIG. 4, a second vehicle 415 is a forklift. The second vehicle 415 carries a second container 425, and the second container 425 receives a portion of the load of proppant 320 from the intermediate storage bin 324. Alternatively, the second container may receive the portion of the load of proppant 320 directly from the first container 316 of the first vehicle 312. In either embodiment, second container 425 is effectively receiving the portion of the load from the first container 316, even though the intermediately storage bin 324 may temporarily store the proppant. During delivery of the portion of the load of proppant 320 into the second container 425, the second container 425 remains on the second vehicle 415 and is not removed from the second vehicle 415. This step is advantageous to the operational efficiency of the proppant delivery system 300 and method. This minimizes "touches" of the second container 425 and prevents the second container 425 from having to be unloaded from the second vehicle 415, loaded with the portion of the load of proppant 320, and then reloaded onto the second vehicle 415.

The second container 425 may be smaller than the first container 316 and is meant to be able to carry only a portion of the load of proppant carried by the first container 316. In an embodiment, the portion of the load of proppant received into the second container 425 from the first container 316 is less than one fourth of the load of proppant carried by the first container 316. In other embodiments, the portion of the load of proppant received into the second container 425 from the first container 316 may be greater or less than one fourth of the load of proppant carried by the first container 316. The second container 425 is preferably made of materials that allow the proppant to be stored at the well site 105. In some embodiments, the second container 425 may be cube shaped while in other embodiments, the second container may be cylindrically shaped. Preferably, the second container 425 is stackable on other containers of similar design, which allows the containers to be more efficiently stored in the proppant storage area 140 of the well site 105.

While the second container 425 may in some embodiments be smaller than the first container 316, in other embodiments, the second container 425 may be the same size as or larger than the first container 316. Such embodiments may provide favorable conditions for having a larger second container 425, such as having a road or travel surface on which the second vehicle 415 travels that is not load limited. Such roads may include private roads or other roads that are not regulated as to the total amount of load that may be carried by a single vehicle.

The second vehicle 415 (e.g., the forklift) illustrated in FIG. 4 is most compatible with the embodiment that positions the proppant delivery system 300 at or immediately adjacent the well site 105. The second vehicle 415 may be used to retrieve an empty second container, deliver the empty second container beneath the intermediate storage bin or first container, allow the second container to be filled with proppant, and then deliver the filled second container either to the proppant storage area 140 or to the mixing area 124 of the well site 105. In some embodiments, the second vehicle 415 may be configured to carry two or more of the second containers 425 at one time and allow both of the second containers 425 to be carried by the second vehicle 415 during receipt of the portion of the load of proppant 320. It should also be apparent based upon the disclosure that the forklift could be used to transport the second container from the remote location 208, but in most instances, such transport would be performed by a second vehicle such as the one illustrated in FIG. 5.

In yet another embodiment, the second vehicle 415, especially when positioned at or near the well site 105, may be a conveyance device (not shown but similar to the electrically or mechanically-driven conveyors described previously) that is used to carry and transport the second container 425. The second container 425 would remain on or attached to this conveyance device during the loading of the second container 425 with proppant and would then be capable of delivering the second container 425 with proppant to either the proppant storage area 140 or the mixing area 124. In an embodiment, the conveyance device may be a conveyor belt that carries the container. In another embodiment, the conveyance device may be an overhead container mover such as, for example, the container handling equipment used to load and unload containers in ship yards and ports.

Referring now more specifically to the embodiment illustrated in FIG. 5, a second vehicle 515 may be any vehicle that is suitable for transporting a second container 525 from the remote location 208 to the well site 205. In an embodiment, the second vehicle 515 may be a truck or a truck and trailer rig capable of transporting one or more of the second containers 525. It should be understood that the second vehicle 515 may be one that is smaller in size than the first vehicle 312 since it does not have to haul the load as far as the distance traveled by the first vehicle 312 and since the second vehicle 515 may only carry a portion of the load of proppant 320 that was carried by the first container 316 of the first vehicle. Like the second vehicle 415 of FIG. 4, the second vehicle 515 carries the second container 525 as the second container 525 receives a portion of the load of proppant 320 from the intermediate storage bin 324. Alternatively, the second container 525 may receive the portion of the load of proppant 320 directly from the first container 316 of the first vehicle 312. In either embodiment, second container 525 is effectively receiving the portion of the load from the first container 316, even if the load is temporarily delivered to the intermediately storage bin 324. During delivery of the portion of the load of proppant 320 into the second container 525, the second container 525 remains on the second vehicle 515 and is not removed from the second vehicle 515. Again, this step is advantageous to the operational efficiency of the proppant delivery system 300 and method since it minimizes "touches" of the second container 525.

The second container 525 is smaller than the first container 316 and is meant to be able to carry only a portion of the load of proppant carried by the first container 316. In an embodiment, the portion of the load of proppant received into the second container 325 from the first container 316 is less than one fourth of the load of proppant carried by the first container 316. The second container 525 is preferably made of materials that allow the proppant to be stored at the well site 205. In some embodiments, the second container 525 may be cube shaped while in other embodiments, the second container may be cylindrically shaped. Preferably, the second container 525 is stackable on other containers of similar design, which allows the containers to be more efficiently stored in the proppant storage area 140 of the well site 205.

While the second container 525 may in some embodiments be smaller than the first container 316, in other embodiments, the second container 525 may be the same size as or larger than the first container 316. Such embodiments may provide favorable conditions for having a larger second container 525, such as having a road or travel surface on which the second vehicle 515 travels that is not load limited. Such roads may include private roads or other roads that are not regulated as to the total amount of load that may be carried by a single vehicle.

The second vehicle 515 (e.g., the truck or truck and trailer rig) illustrated in FIG. 5 is most compatible with the embodiment that positions the proppant delivery system 300 at the remote location 208. The second vehicle 515 may be used to retrieve an empty second container, deliver the empty second container beneath the intermediate storage bin or first container, allow the second container to be filled with proppant, and then deliver the filled second container to the well site 205. In some embodiments, the second vehicle 515 may be configured to carry two or more of the second containers 525 at one time and allow both of the second containers 525 to be carried by the second vehicle 515 during receipt of the portion of the load of proppant 320.

In addition to the embodiments and examples of a proppant delivery system and method provided above, the following are additional illustrative examples.

Example 1. A proppant delivery system for delivering proppant to a well site comprises a first vehicle having a first container configured to carry a first load of proppant and deliver the first load of proppant to a location; and a second vehicle configured to deliver a second container at the location to receive a portion of the first load into the second container, the container remaining on the second vehicle during loading of the second container.

Example 2. The system of example 1, wherein the location is a well site at which the proppant will be used to fracture a well.

Example 3. The system of example 1, wherein the location is a location remote from a well site at which the proppant will be used to fracture a well.

Example 4. The system of any of examples 1-3, wherein the second container is smaller than the first container.

Example 5. The system of any of examples 1-3, wherein the second container is larger than the first container.

Example 6. The system of any of examples 1-5, wherein the portion of the first load received into the second container is a less than one fourth of the first load.

Example 7. The system of any of examples 1-6, wherein the second container is stackable on other similar containers at the first site to store the proppant for later use.

Example 8. The system of any of examples 1-7, wherein the portion of the first load is delivered into the second container by an intermediate storage bin positioned above the second container.

Example 9. The system of any of examples 1-8, wherein the portion of the first load is delivered into the second container by an electrically, mechanically or pneumatically-driven conveyance device.

Example 10. The system of any of examples 1-9, wherein the first vehicle is a truck.

Example 11. The system of any of examples 1-10, wherein the second vehicle is a forklift.

Example 12. The system of any of examples 1-11, wherein the second vehicle is an electrically or mechanically-driven conveyance device.

Example 13. A method of delivering a proppant to a well site, the method comprises delivering a first load of proppant to a location; delivering a portion of the first load into a second container while the second container remains on a mover; and transporting the second container on the mover to a storage area.

Example 14. The method of example 13, wherein the location is a well site at which the proppant will be used to fracture a well.

Example 15. The method of any of examples 13-14, wherein the location is a location remote from a well site at which the proppant will be used to fracture a well.

Example 16. The method of any of examples 13-15, wherein the portion of the first load delivered into the second container is a less than one fourth of the first load.

Example 17. The method of any of examples 13-16, wherein the second vehicle is a forklift.

Example 18. The method of any of examples 13-17 further comprising delivering the first load of proppant into an intermediate storage bin prior to the portion of the first load being delivered to the second container; wherein delivering the portion of the first load into the second container further comprises dropping the portion of the first load from the intermediate storage bin into the second container.

Example 19. The method of any of examples 13-18, wherein delivering the portion of the first load into the second container further comprises moving the portion of the first load into the second container using an electrically, mechanically or pneumatically-driven conveyance device.

Example 20. The method of any of examples 13-19 further comprising stacking the second container on another similar container at the storage area.

Example 21. A proppant delivery system for delivering proppant from a proppant source to a location, the system comprising a first vehicle having a first container configured to carry a first load of proppant from a proppant source and deliver the first load of proppant to a location over at least one roadway; and a second vehicle configured to move a plurality of second containers at the location, each of the second containers configured to receive a portion of the first load until the first load is removed from the first container, each of the second containers remaining on the second vehicle while being loaded; wherein the location is a well site at which the proppant will be used to fracture a well, or a site remote from the well site; wherein the second container is smaller than the first container; wherein the portion of the first load received into the second container is less than or equal to one fourth of the first load, and the plurality of second containers comprises at least four second containers; wherein the second vehicle is a forklift.

Example 22. The system of example 21, wherein the portion of the first load received by each of the second containers is delivered by an intermediate storage bin positioned above each second container as the second container remains on the second vehicle.

Although the present disclosure and its advantages have been described in detail, it should be understood that various changes, substitutions and alterations can be made herein without departing from the spirit and scope of the disclosure as defined by the following claims.

What is claimed is:

1. A proppant delivery system for delivering proppant to a well site comprising:

a first vehicle having a first container configured to carry a first load of proppant and deliver the first load of proppant to a location;

a second vehicle configured to deliver a second container at the location to receive a portion of the first load into the second container, the second container remaining on the second vehicle during loading of the second container; wherein the second vehicle is a forklift; and an intermediate storage bin positioned above the second container, the intermediate storage bin configured to receive at least the portion of the first load of the proppant from the first container and deliver the portion into the second container.

2. The system of claim 1, wherein the location is the well site at which the proppant will be used to fracture a well.

3. The system of claim 1, wherein the location is a location remote from the well site at which the proppant will be used to fracture a well.

4. The system of claim 1, wherein the second container is smaller than the first container.

5. The system of claim 1, wherein the second container is larger than the first container.

6. The system of claim 1, wherein the portion of the first load received into the second container is less than one fourth of the first load.

7. The system of claim 1, wherein the second container is stackable on other similar containers at the first site to store the proppant for later use.

8. The system of claim 1, wherein the portion of the first load is delivered from the first container to the intermediate storage bin by an electrically, mechanically or pneumatically-driven conveyance device.

9. The system of claim 1, wherein the first vehicle is a truck.

10. The system of claim 1, wherein the second vehicle is an electrically or mechanically-driven conveyance device.

11. A method of delivering a proppant to a well site, the method comprising:

delivering a first load of proppant to a location;

delivering a portion of the first load into a second container while the second container remains on a mover; wherein the mover is a forklift;

transporting the second container on the mover to a storage area;

wherein at least the portion of the first load of the proppant is delivered into an intermediate storage bin prior to the portion of the first load being delivered to the second container, the intermediate storage bin being positioned above the mover; and wherein delivering the portion of the first load into the second container further comprises dropping the portion of the first load from the intermediate storage bin into the second container.

12. The method of claim 11, wherein the location is the well site at which the proppant will be used to fracture a well.

13. The method of claim 11, wherein the location is a location remote from the well site at which the proppant will be used to fracture a well.

14. The method of claim 11, wherein the portion of the first load delivered into the second container is less than one fourth of the first load.

15. The method of claim 11, wherein delivering the portion of the first load into the intermediate storage bin further comprises:

moving the portion of the first load into the second container using an electrically, mechanically or pneumatically-driven conveyance device.

16. The method of claim 11 further comprising:

stacking the second container on another similar container at the storage area.

17. A proppant delivery system for delivering proppant from a proppant source to a location, the system comprising:

a first vehicle having a first container configured to carry a first load of proppant from the proppant source and deliver the first load of proppant to a location over at least one roadway; and a second vehicle configured to move a plurality of second containers at the location, each of the second containers configured to receive a respective portion of the first load until the first load is removed from the first container, each of the second containers remaining on the second vehicle while being loaded;

an intermediate storage bin positioned above each respective second container, the intermediate storage bin configured to receive each respective portion of the first load of the proppant from the first container and deliver each respective portion into each respective second container as each respective second container remains on the second vehicle;

wherein the location is a well site at which the proppant will be used to fracture a well, or a site remote from the well site;

wherein the second container is smaller than the first container;

wherein the portion of the first load received into the second container is less than or equal to one fourth of the first load, and the plurality of second containers comprises at least four second containers;

wherein the second vehicle is a forklift.

* * * * *